July 20, 1937.   R. F. DAVIS   2,087,340
ELECTRICAL PROTECTIVE SYSTEM
Filed Aug. 27, 1936

INVENTOR
R. F. Davis
BY William R. Ballard
ATTORNEY

Patented July 20, 1937

2,087,340

UNITED STATES PATENT OFFICE 2,087,340

ELECTRICAL PROTECTIVE SYSTEM

Rowland Fenner Davis, Tuckahoe, N. Y., assignor to American Telephone and Telegraph Company, a corporation of New York Application August 27, 1936, Serial No. 98,236

2 Claims. (Cl. 171—97)

This invention relates to power circuits and to circuits and apparatus for the transmission of electric currents. This invention also relates to circuits and apparatus for the protection of power circuits as well as of transmission circuits.

In multiphase power transmission systems, for example, in which a transformer primary winding is connected between a phase wire and the neutral conductor, and the secondary winding is connected to a three-wire circuit supplying power to a plurality of subscribers, it is the custom to connect a lightning arrester or a plurality of such arresters to the circuits for by-passing the lightning voltages to ground before they reach the subscribers' circuits. This involves in general some connection between the phase and neutral wires with the lighting arrester, or arresters, and with the ground or neutral conductor of the three-wire circuit.

In many cases, in order to improve the grounding conditions of the neutral conductor of the three-wire circuit, this neutral conductor is metallically connected to the neutral conductor of the higher voltage primary circuit supplying the transformer. This interconnection results in a condition of multiple grounds on the neutral conductor of the primary circuit and may, under a variety of conditions, result in undesirably high magnitudes of noise on paralleling telephone circuits.

It is one of the objects of this invention to improve these conditions by modifying the power circuits so that the noise induction problems due to this source may be eliminated.

It has been discovered that if a varistor such as thyrite (silicon carbide) is interposed between the primary and secondary neutral conductors of the power system in addition to the lightning arrester, the detrimental conditions referred to will be greatly reduced if not practically entirely eliminated.

It is therefore another object of this invention to employ a varistor such as thyrite or other non-linear ohmic resistor in a power system for reducing or eliminating noise induction into signaling circuits to which the power system may be exposed.

These and other objects of the invention will be better understood from the detailed description hereinafter following, when read in connection with Figs. 1 and 2 of the accompanying drawing which disclose two embodiments of the invention merely for the sake of illustration.

Figure 1:
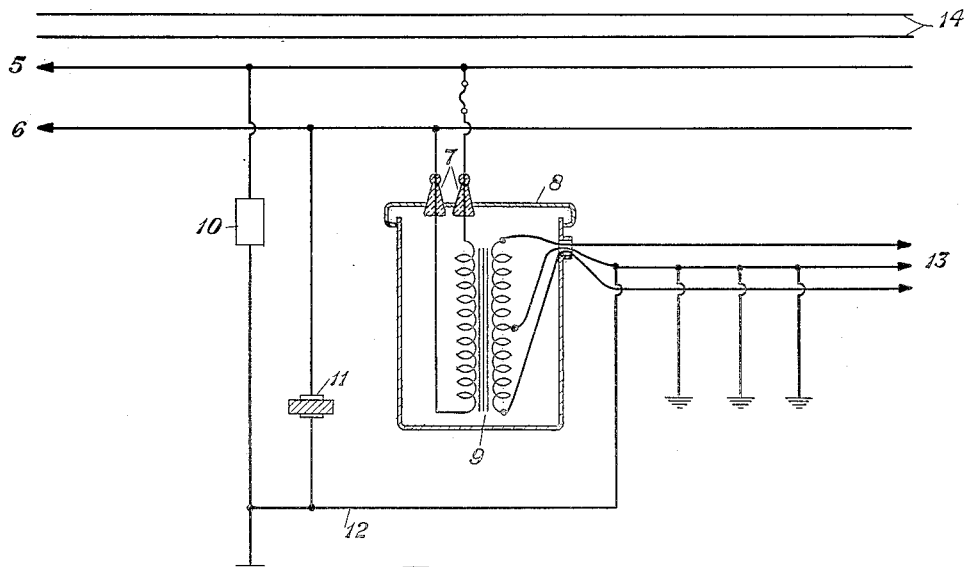

Referring to Figure 1 of the drawing, reference characters 5 and 6 represent two power conductors such as a primary phase conductor and the primary neutral conductor, respectively, of a polyphase power transmission system. The conductors 5 and 6 are connected to the primary winding of a transformer 9 mounted in a casing 8 of usual type, the connection being established by means of two conductors which pass through two insulated bushings 7, as shown. The primary phase conductor 5 may be normally operated at a voltage up to about 8000 volts above ground and the primary neutral wire 6 may under normal operating conditions be less than 100 volts above ground. The transformer casing 8 may be grounded, if desired, but this is not essential.

The secondary winding of the transformer 9 is connected to a three-wire distribution circuit 13 of the usual type which supplies power to subscribers, the three wires 13 being connected to the outer terminals and midpoint of the transformer secondary winding. These three wires may be inserted into the transformer casing by means of a common insulated bushing or by other means well known in the art. The neutral conductor of this three-wire circuit may be grounded at one or more points which may be at service entrances or elsewhere. As is well known in the art the voltage between the outer distribution conductors 13 will be approximately 220 volts and that between either of these outer conductors and the neutral conductor thereof approximately 110 volts.

A lightning arrester 10 of any well known type may be connected between the primary phase conductor 5 and a ground terminal which may, for example, be driven at the foot of the pole carrying the transformer casing 8 and its contents. The grounded terminal of the lightning arrester 10 may also be connected by conductor 12 to that wire of the three-wire circuit 13 which extends to the midpoint of the transformer secondary winding as shown.

The arrangement so far described will transmit power from the circuit 5—6, stepped down in voltage by means of transformer 9 of the three-wire distribution circuit 13. Lightning and other abnormal power surges will be by-passed from the primary phase wire 5 to ground through the lightning arrester 10. These lightning and other abnormal power voltages, when so by-passed to ground, will have little or no effect upon the distribution circuit 13.

However, the interconnection of the primary neutral conductor with the local ground of the distribution circuit 13 as was formerly the practice in the art, may introduce serious inductive coordination problems and other problems with respect to telephone or other signaling circuits which may run parallel with or be in the neighborhood of or otherwise become exposed to the power system. Such a telephone or other signaling circuit is illustrated schematically and is designated 14 in the drawing.

These difficulties may be greatly reduced if not entirely eliminated by inserting between the primary neutral conductor 6 and the grounded conductor 12 a non-linear resistor (a varistor) 11, such, for example, as thyrite (silicon carbide), which is of the proper dimensions and suitably housed and mounted. The device 11 is bilaterally conductive whenever current flows therethrough, the device conducting electricity equally in the two directions of polarity. It is non-linear in its resistance in the sense that doubling the voltage applied thereto will not double the current therethrough. Its characteristic may be generally expressed as follows:

$$I = aV^N$$

where I is the current through the device 11, V is the voltage applied to its two opposite faces or sides, $a$ is a constant depending upon the material and its dimensions and N is a constant greater than unity, and also depends on the nature of the material.

The device 11 is shown connected by means of wire 12 between the primary neutral conductor 6 and the multigrounded neutral conductor of the three-wire circuit 13. It thus presents under normal conditions a comparatively large resistance or impedance between the conductor 6 and the neutral secondary wire—a resistance of several hundred or more ohms. The device 11 hence effectively segregates the primary neutral conductor 6 from the various local grounds of the distribution circuit 13.

When, however, the voltage applied to the primary neutral conductor 6 increases substantially, either due to lightning surges or to abnormal power conditions, the impedance of the device 11 will then materially decrease. The device 11 would then present a low impedance between conductor 6 and the various local grounds of the secondary distribution circuit 13. During the presence of the disturbance—that is, when the voltages are abnormally high—there will be the practical equivalent of a direct metallic connection between conductor 6 and the neutral wire of circuit 13.

The device 11 effectively segregates the two neutral conductors under normal operating conditions and, moreover, instantly establishes a good conductive path therebetween under abnormal conditions. It is accomplished without employing any moving parts whatever in the protection system. The protection for the power transformer against lightning and other abnormal surges will then be considerable and the exposed signaling circuit 14 will be practically unaffected under normal power operating conditions.

Figure 2:
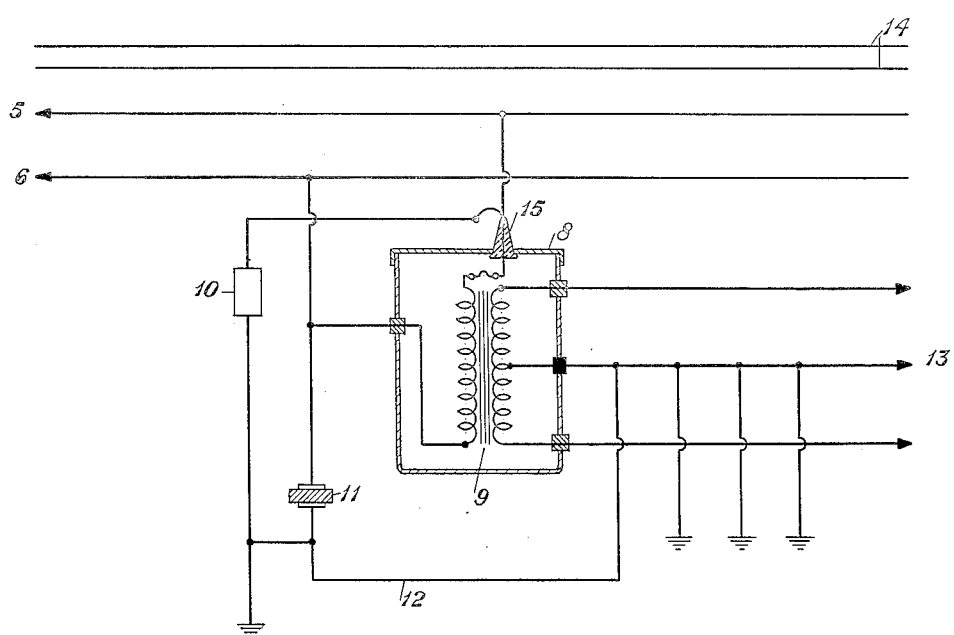

Fig. 2 is a slight modification of the arrangement of Fig. 1. Primary phase wire 5 is connected to ground through the lightning arrester 10 as in Fig. 1, but the upper terminal of the primary winding of the transformer 9 is connected to wire 5 by a conductor extending through a primary bushing 15 at the transformer casing 8. The outer wires of the three-wire circuit 13 pass through low voltage bushings mounted in the transformer casing 8. The wire extending from the lower terminal of the transformer primary winding passes through a smaller bushing, as shown in Fig. 2.

The arrangement illustrated in Figs. 1 and 2 eliminates during normal operation of the power system, the multiple grounds connected to the primary neutral wire 6 of former systems. Consequently currents—including harmonic components—cannot normally be transmitted from one neutral wire such as 6 to the neutral wire of circuit 13 or in the reverse direction, or permitted to flow in substantial amount through the earth. Noise induction problems are, therefore, greatly diminished if not entirely eliminated.

Furthermore the thyrite or silicon carbide device 11 of these circuits prevents the flow under normal conditions of appreciable direct current between the primary and secondary networks. This is an important feature of these circuits.

The lightning arrester 10 is shown as housed externally of the transformer casing 8. If desired the arrester 10 may be mounted within the casing 8.

While certain numerical voltage values have been recited hereinabove to explain possible applications of the arrangements illustrated, these voltage values are not to be construed as limitations, but it will be understood that other values may readily be assigned to the system if desired.

The arrangements illustrated have been described with respect to a polyphase power generating and distributing system. It will be understood that this arrangement may equally well be applied to systems other than power systems such, for example, as telephone or signaling systems.

What is claimed is:

1. The combination of two circuits which may be subjected to high voltages as well as low voltages each circuit including a neutral conductor, and means connected between the neutral conductor of one circuit and the neutral conductor of the other circuit for insulating said circuits from each other during the application of the low voltages and for conductively connecting said circuits during the application of high voltages, said means comprising a device having the characteristics $I = aV^N$ where I is the current through the device, V the applied voltage, N a number greater than unity and $a$ a constant.

2. The combination of two circuits which may be subjected to high voltages as well as low voltages, each circuit including a neutral conductor, and means connected between the neutral conductor of one circuit and the neutral conductor of the other circuit for insulating said circuits from each other during the application of the low voltages and for conductively connecting said circuits during the application of high voltages, said means comprising a composition of silicon carbide material.

ROWLAND F. DAVIS.